US012689852B1

(12) United States Patent　　　　(10) Patent No.:　US 12,689,852 B1

Files et al.　　　　　　　　　　　　(45) Date of Patent:　　Jul. 21, 2026

---

(54) DUAL FACING SPEAKER AND TOUCH INPUT

(71) Applicant: Dell Products L.P., Round Rock, TX (US)

(72) Inventors: Jace W. Files, Round Rock, TX (US); Brandon J. Brocklesby, Pflugerville, TX (US); John T. Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/035,232

(22) Filed: Jan. 23, 2025

(51) Int. Cl.
　　*H04R 1/02*　　　(2006.01)
　　*G06F 3/01*　　　(2006.01)
　　*G06F 3/02*　　　(2006.01)
　　*G06F 3/044*　　(2006.01)
　　*H04R 17/00*　　(2006.01)

(52) U.S. Cl.
　　CPC ............. *H04R 1/028* (2013.01); *G06F 3/016* (2013.01); *G06F 3/02* (2013.01); *G06F 3/044* (2013.01); *H04R 17/00* (2013.01); *H04R 2400/03* (2013.01); *H04R 2499/15* (2013.01)

(58) Field of Classification Search
None
See application file for complete search history.

(56) References Cited

U.S. PATENT DOCUMENTS

| | | | |
|---|---|---|---|
| 2020/0073448 A1 | 3/2020 | Xiao | |
| 2021/0096613 A1* | 4/2021 | Peeler | ................... G06F 1/1686 |
| 2022/0187926 A1* | 6/2022 | North | ................... G06F 1/1647 |
| 2023/0199354 A1* | 6/2023 | Kim | ..................... H04R 1/2857 |
| | | | 381/395 |

* cited by examiner

*Primary Examiner* — Stephen T. Reed

(74) *Attorney, Agent, or Firm* — Jackson Walker L.L.P.

(57)　　　　　ABSTRACT

An information handling system may include a keyboard assembly and a display assembly rotatably coupled to the keyboard assembly and comprising a display, a cover mechanically coupled to the display, and a piezoelectric transducer interfaced between the display and the cover and configured to generate sound from the display in response to the display assembly being in a closed position relative to the keyboard assembly and generate sound from the cover in response to the display assembly being in an open position relative to the keyboard assembly.

15 Claims, 4 Drawing Sheets

DUAL FACING SPEAKER AND TOUCH INPUT

TECHNICAL FIELD

The present disclosure relates in general to information handling systems, and more particularly to systems and methods for enabling user interaction to control privacy settings of a notebook while the notebook is in a closed position.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a notebook computer, which may also be referred to as a laptop. A notebook may comprise a display assembly rotatably coupled to a keyboard assembly via a hinge, allowing a user to open the display assembly relative to the keyboard assembly to a desired angle, as well as close the keyboard assembly relative to the display assembly to an angle of approximately zero degrees.

Increasingly, notebooks are being designed to remain at least partially functional and undertake particular tasks when closed. For example, a notebook may playback audio, conduct an audio conference, record audio, or undertake other tasks while closed. Accordingly, it may be desirable to optimize a notebook for playback of audio in both open positions and closed positions of the notebook.

SUMMARY

In accordance with the teachings of the present disclosure, the disadvantages and problems associated with traditional approaches to audio playback in a notebook may be substantially reduced or eliminated.

In accordance with embodiments of the present disclosure, an information handling system may include a keyboard assembly and a display assembly rotatably coupled to the keyboard assembly and comprising a display, a cover mechanically coupled to the display, and a piezoelectric transducer interfaced between the display and the cover and configured to generate sound from the display in response to the display assembly being in a closed position relative to the keyboard assembly and generate sound from the cover in response to the display assembly being in an open position relative to the keyboard assembly.

In accordance with these and other embodiments of the present disclosure, a method may include, in an information handling system having a keyboard assembly and a display assembly rotatably coupled to the keyboard assembly and comprising, wherein the display assembly includes a display and a cover mechanically coupled to the display: generating sound from the display by a piezoelectric transducer interfaced between the display and the cover in response to the display assembly being in a closed position relative to the keyboard assembly and generating sound from the cover by the piezoelectric transducer in response to the display assembly being in an open position relative to the keyboard assembly.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system having a keyboard assembly and a display assembly rotatably coupled to the keyboard assembly and comprising, wherein the display assembly includes a display and a cover mechanically coupled to the display: cause generation of sound from the display by a piezoelectric transducer interfaced between the display and the cover in response to the display assembly being in a closed position relative to the keyboard assembly and cause generation of sound from the cover by the piezoelectric transducer in response to the display assembly being in an open position relative to the keyboard assembly.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

Figure 1:
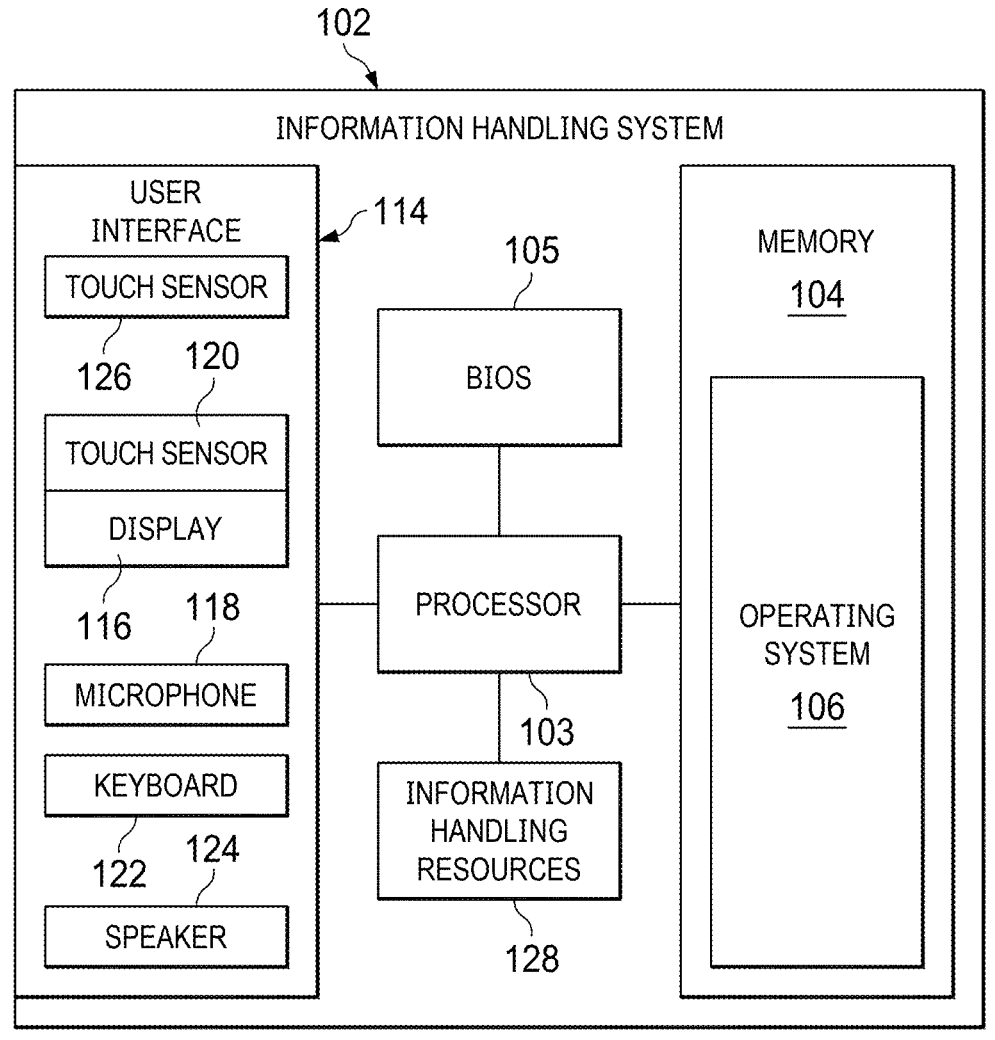
FIG. 1 illustrates a block diagram of selected components of an example information handling system, in accordance with embodiments of the present disclosure.

FIG. 1 illustrates a block diagram of selected components of an example information handling system 102, in accordance with embodiments of the present disclosure. In some embodiments, information handling system 102 may comprise or be an integral part of a server. In some embodiments, information handling system 102 may be a personal computer (e.g., a desktop computer or a portable computer). In other embodiments, information handling system 102 may comprise a mobile device (e.g., a smart phone, a tablet computing device, a handheld computing device, a personal digital assistant, or any other device that may be readily transported on a person of a user of such mobile device).

As depicted in FIG. 1, information handling system 102 may include a processor 103, a memory 104 communicatively coupled to processor 103, a user interface 114 communicatively coupled to processor 103, and one or more information handling resources 128 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

As shown in FIG. 1, memory 104 may have stored therein an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface. Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105.

User interface 114 may comprise any instrumentality or aggregation of instrumentalities by which a user may interact with information handling system 102. For example, user interface 114 may permit a user to input data and/or instructions into information handling system 102 (e.g., via a keypad, keyboard, touch screen, microphone, camera, and/or other data input device), and/or otherwise manipulate information handling system 102 and its associated components. User interface 114 may also permit information handling system 102 to communicate data to a user (e.g., via a display device, speaker, and/or other data output device). As shown in FIG. 1, user interface 114 may include one or more of each of a display 116, a microphone 118, a keyboard 122, a speaker 124, a touch sensor 120 associated with display 116, a second touch sensor 126, and/or one or more other input and/or output devices.

Display 116 may comprise any suitable system, device, or apparatus configured to display human-perceptible graphical data and/or alphanumeric data to a user. For example, in some embodiments, display 116 may comprise a liquid crystal display or organic light-emitting diode display.

Touch sensor 120 may be mechanically coupled to and may overlay display 116, and may include any suitable system, device, or apparatus configured to sense contact from (or in some instances, proximity to) a stylus or a user's finger or hand with the surface of touch sensor 120 and detect a position of such contact on the surface. Accordingly, the combination of display 116 and touch sensor 120 may comprise a touch screen, allowing a user to directly interact with graphical elements displayed to display 116. In some embodiments, touch sensor 120 may comprise a capacitive sensor.

As described in greater detail below, touch sensor 126 may be present proximate to a cover (e.g., an A-cover) of a housing for information handling system 102, and may include any suitable system, device, or apparatus configured to sense contact from (or in some instances, proximity to) a stylus or a user's finger or hand with the surface of the cover and detect a position of such contact on the surface. In some embodiments, touch sensor 126 may comprise a capacitive sensor.

Microphone 118 may comprise any system, device, or apparatus configured to convert sound incident at microphone 118 to an electrical signal that may be processed by processor 103. In some embodiments, microphone 118 may include a capacitive microphone (e.g., an electrostatic microphone, a condenser microphone, an electret microphone, a microelectromechanical systems (MEMS) microphone, etc.) wherein such sound is converted to an electrical signal using a diaphragm or membrane having an electrical capacitance that varies based on sonic vibrations received at the diaphragm or membrane.

Keyboard 122 may comprise any system, device, or apparatus modeled after a typewriter keyboard which uses an arrangement of buttons or keys to act as mechanical levers or electronic switches to allow a user to enter text, numbers, and/or symbols into operating system 106 or application software running on operating system 106.

Speaker 124 may comprise any system, device, or apparatus configured to produce sound in response to electrical audio signal input.

In addition to processor 103, memory 104, BIOS 105, and user interface 114, information handling system 102 may include one or more other information handling resources 128. Such an information handling resource 128 may include any component system, device or apparatus of an information handling system, including without limitation, a processor, bus, memory, I/O device and/or interface, storage resource (e.g., hard disk drives), network interface, electromechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
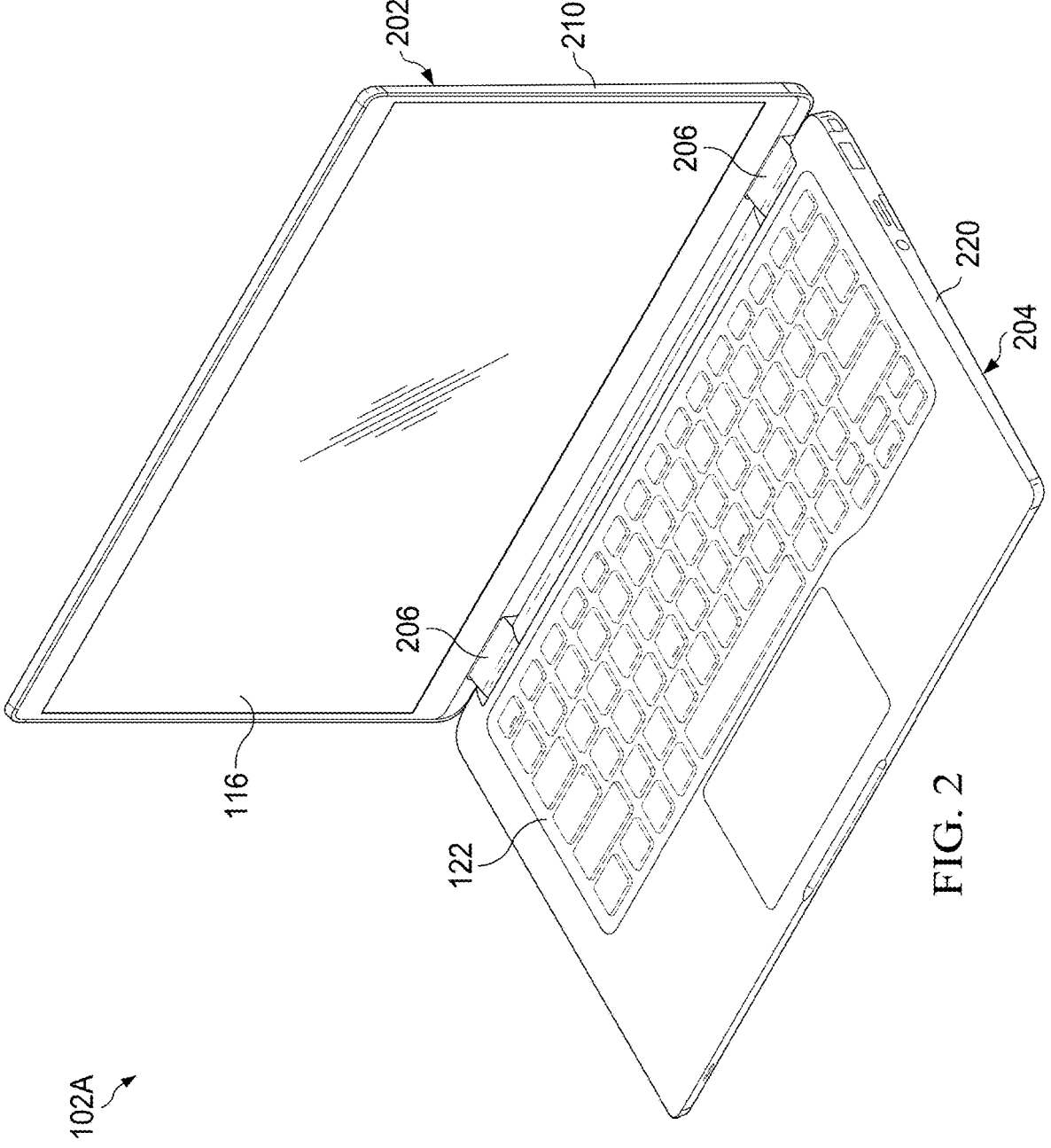
FIG. 2 illustrates an isometric perspective view of selected components of an example notebook in an open position of the notebook, in accordance with embodiments of the present disclosure.

FIG. 2 illustrates an isometric perspective view of selected components of an example notebook 102A in an open position, in accordance with embodiments of the present disclosure. Notebook 102A may implement information handling system 102. As shown in FIG. 2, notebook 102A may include a display assembly 202 and a keyboard assembly 204 rotatably coupled to one another via one or more hinges 206. Display assembly 202 may comprise a housing 210 that may house components of notebook 102A including a display 116. Keyboard assembly 204 may comprise a housing 220 that may house components of notebook 102A including keyboard 122 for inputting information to notebook 102A. Keyboard assembly 204 may also include other components of information handling system 102 (e.g., processor 103, memory 104, BIOS 105, certain components of user interface 114, information handling resources 128, etc.) not explicitly depicted in FIG. 2.

Figure 3:
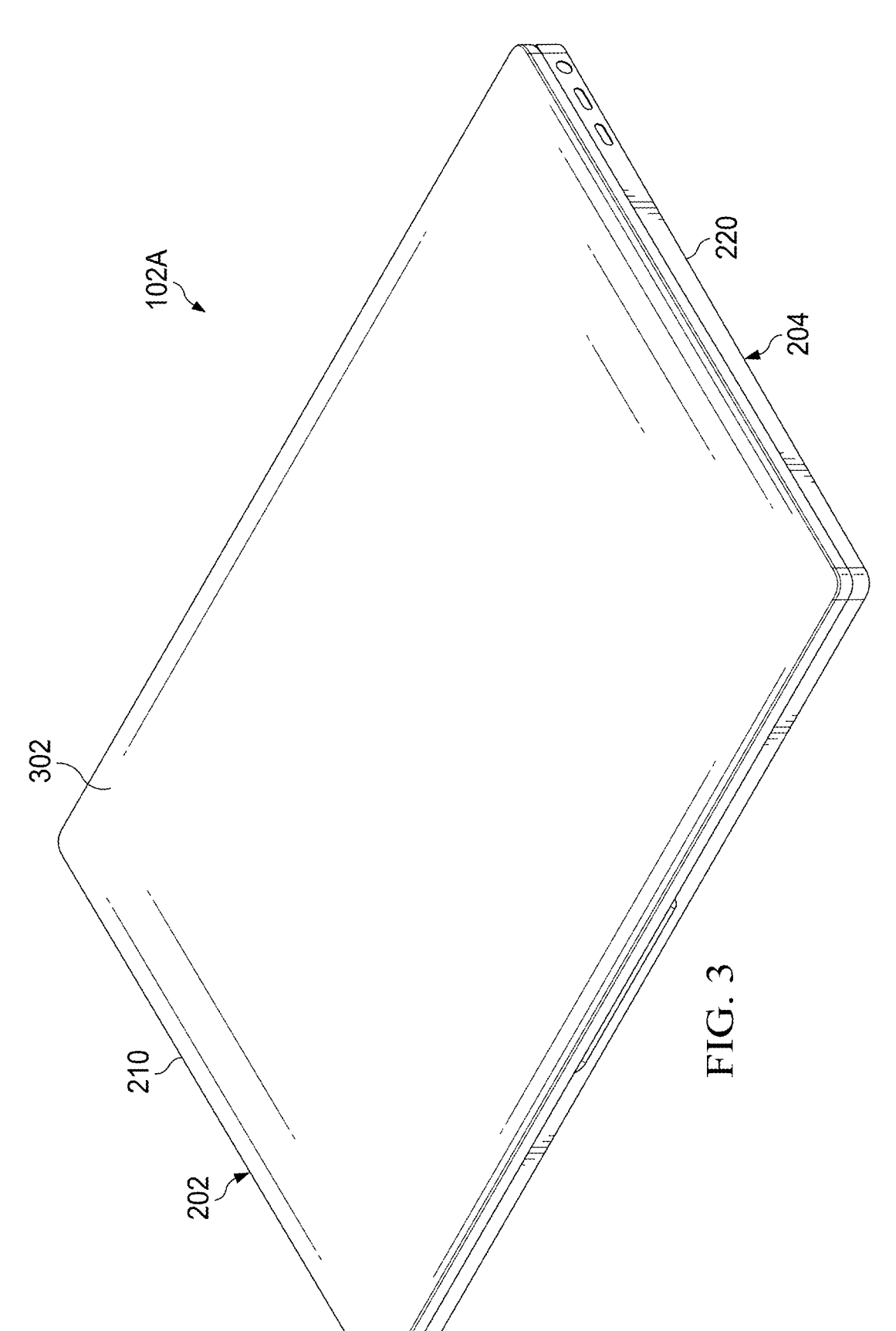
FIG. 3 illustrates an isometric perspective view of selected components of the notebook of FIG. 2 in a closed position of the notebook, in accordance with embodiments of the present disclosure.

FIG. 3 illustrates an isometric perspective view of selected components of example notebook 102A in a closed position, in accordance with embodiments of the present disclosure. As shown in FIG. 3, housing 210 may include a top cover 302, which is often referred to in the art as an "A-cover."

Figure 4:
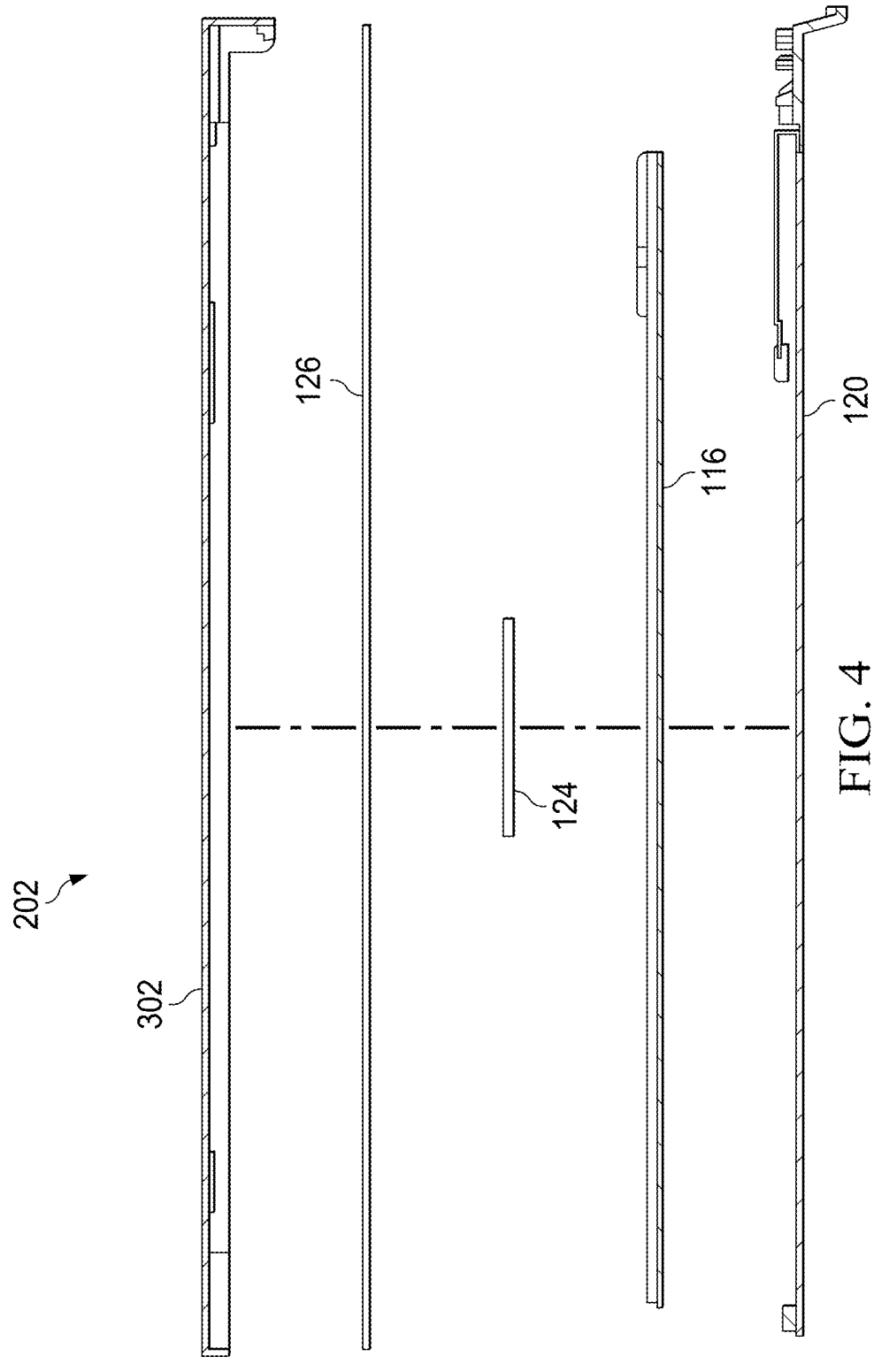
FIG. 4 illustrates an exploded side cross-sectional elevation view of selected components of a display assembly of the notebook of FIGS. 2 and 3, in accordance with embodiments of the present disclosure.

FIG. 4 illustrates an exploded side cross-sectional elevation view of selected components of display assembly 202, in accordance with embodiments of the present disclosure. As shown in FIG. 4, display assembly 202 may include speaker 124 interfaced between touch sensor 126 and display 116, with touch sensor 126 interfaced between top cover 302 and speaker 124, and with display 116 interfaced between speaker 124 and touch sensor 120. In some embodiments, touch sensor 120 may be integrated within a glass cover of display 116. In these and other embodiments, speaker 124 may be implemented with a piezoelectric transducer.

Also, in some embodiments, touch sensor 126 may not be present in notebook 102A, in which case touch sensor 120 may be used to sense user interaction with the surface of top cover 302, as described in U.S. patent application Ser. No. 19/034,959 filed Jan. 23, 2025, which is incorporated by reference herein in its entirety.

In operation, speaker 124 implemented as piezoelectric transducer and mechanically coupled to touch sensor 120/display 116 and top cover 302 may allow speaker 124 to generate audio towards the user by vibrating display 116/touch sensor 120 when notebook 102A is in an open position and generate audio by vibrating top cover 302 when notebook 102A is in the closed position. Accordingly, a single piezoelectric transducer may be leveraged to provide audio in both the open and closed positions.

Further, processor 103 may detect whether notebook 102A is in an open position or closed position and based thereon, control speaker 124 to optimize audio playback, as the sound performance of speaker 124 may vary based on whether notebook 102A is in the open position or the closed position. There are many suitable approaches to detecting whether a notebook 102A is in a closed or open position, all of which are beyond the scope of this disclosure.

In addition, in some embodiments, speaker 124 implemented as piezoelectric transducer may, in the closed position of notebook 102A, provide haptic feedback in response to user interaction with top cover 302 that is sensed by touch sensor 126 (or in the absence of touch sensor 126, by touch sensor 120). Accordingly, processor 103 may be configured to receive signals from touch sensor 120 and/or touch sensor 126 indicative of user interaction with top cover 302 in the closed position of notebook 102A, and in response to such signals, cause speaker 124 to vibrate (e.g., at frequencies outside the audio spectrum) to provide such haptic feedback to the user.

While the terms "top," "bottom," "front," "back," and "side" are used for purposes of exposition and clarity, such terms are not intended to limit any of the components disclosed herein to a particular orientation or configuration.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a keyboard assembly; and
a display assembly rotatably coupled to the keyboard assembly and comprising:
  a display;
  a cover mechanically coupled to the display; and
  a piezoelectric transducer interfaced between the display and the cover and configured to generate sound from the display in response to the display assembly being in a closed position relative to the keyboard assembly and generate sound from the cover in response to the display assembly being in an open position relative to the keyboard assembly;
a processor communicatively coupled to the piezoelectric transducer and configured to:
  in response to the display assembly being in the open position relative to the keyboard assembly, control the piezoelectric transducer to optimize sound performance of the piezoelectric transducer in the open position; and
  in response to the display assembly being in the closed position relative to the keyboard assembly, control the piezoelectric transducer to optimize sound performance of the piezoelectric transducer in the closed position.

2. The information handling system of claim 1, further comprising a touch sensor.

3. The information handling system of claim 2, wherein the display is interfaced between the touch sensor and the piezoelectric transducer.

4. The information handling system of claim 2, wherein the touch sensor is interfaced between the cover and the piezoelectric transducer.

5. The information handling system of claim 2, further comprising the processor communicatively coupled to the piezoelectric transducer and the touch sensor and configured to cause the piezoelectric transducer to generate haptic feedback responsive to user interaction sensed by the touch sensor.

6. The information handling system of claim 2, wherein the touch sensor is a capacitive sensor.

7. The information handling system of claim 2, wherein the touch sensor is integrated within a glass cover for the display.

8. A method comprising, in an information handling system having a keyboard assembly and a display assembly rotatably coupled to the keyboard assembly and comprising, wherein the display assembly includes a display and a cover mechanically coupled to the display:
  generating sound from the display by a piezoelectric transducer interfaced between the display and the cover in response to the display assembly being in a closed position relative to the keyboard assembly;
  generating sound from the cover by the piezoelectric transducer in response to the display assembly being in an open position relative to the keyboard assembly;
  in response to the display assembly being in the open position relative to the keyboard assembly, controlling the piezoelectric transducer to optimize sound performance of the piezoelectric transducer in the open position; and
  in response to the display assembly being in the closed position relative to the keyboard assembly, controlling the piezoelectric transducer to optimize sound performance of the piezoelectric transducer in the closed position.

9. The method of claim 8, wherein:

the information handling system further comprises a touch sensor; and generating haptic feedback by the piezoelectric transducer responsive to user interaction sensed by the touch sensor.

10. The method of claim 9, wherein the display is interfaced between the touch sensor and the piezoelectric transducer.

11. The method of claim 9, wherein the touch sensor is interfaced between the cover and the piezoelectric transducer.

12. The method of claim 9, wherein the touch sensor is a capacitive sensor.

13. The method of claim 9, wherein the touch sensor is integrated within a glass cover for the display.

14. An article of manufacture comprising:

a non-transitory computer-readable medium; and computer-executable instructions carried on the computer-readable medium, the instructions readable by a processor, the instructions, when read and executed, for causing the processor to, in an information handling system having a keyboard assembly and a display assembly rotatably coupled to the keyboard assembly and comprising, wherein the display assembly includes a display and a cover mechanically coupled to the display:

cause generation of sound from the display by a piezoelectric transducer interfaced between the display and the cover in response to the display assembly being in a closed position relative to the keyboard assembly;

cause generation of sound from the cover by the piezoelectric transducer in response to the display assembly being in an open position relative to the keyboard assembly;

in response to the display assembly being in the open position relative to the keyboard assembly, control the piezoelectric transducer to optimize sound performance of the piezoelectric transducer in the open position; and in response to the display assembly being in the closed position relative to the keyboard assembly, control the piezoelectric transducer to optimize sound performance of the piezoelectric transducer in the closed position.

15. The article of claim 14, further comprising:

the information handling system further comprising a touch sensor; and the instructions for causing generation of haptic feedback by the piezoelectric transducer responsive to user interaction sensed by the touch sensor.

* * * * *